United States Patent [19]
Calcagni

[11] Patent Number: 4,462,778
[45] Date of Patent: Jul. 31, 1984

[54] EXTRUSION HEAD FOR EXTRUDING MOULDINGS FOR ROLLER BLINDS, FRAMES, FINISH AND THE LIKE

[76] Inventor: Mario Calcagni, Via Roccolo, 24, Morazzone (Province of Varese), Italy

[21] Appl. No.: 346,807

[22] Filed: Feb. 8, 1982

[30] Foreign Application Priority Data

Feb. 19, 1981 [IT] Italy .................. 19858 A/81

[51] Int. Cl.³ .............................................. B29F 3/04
[52] U.S. Cl. ............................. 425/113; 156/244.13; 156/500; 264/173; 264/174; 425/133.1; 425/462
[58] Field of Search ............... 425/133.1, 131.1, 4 C, 425/462, 113, 114; 264/171, 173, 45.9, 46.1, 174, 46.7; 428/36, 309.9; 156/244.13, 500

[56] References Cited

U.S. PATENT DOCUMENTS

| | | | |
|---|---|---|---|
| 3,088,166 | 5/1963 | Colombo | 264/177 R |
| 3,331,900 | 7/1967 | Thomas | 264/46.1 |
| 3,533,134 | 10/1970 | Blomqvist | 425/133.1 |
| 3,764,642 | 10/1973 | Boutillier | 264/48 |
| 3,772,129 | 11/1973 | Dover | 264/46.7 |
| 4,073,673 | 2/1978 | Raabe et al. | 264/177 R |
| 4,081,232 | 3/1978 | Pemberton et al. | 425/467 |
| 4,130,976 | 12/1978 | Kesseler et al. | 52/656 |
| 4,281,492 | 8/1981 | Schock et al. | 264/46.1 |

FOREIGN PATENT DOCUMENTS

| | | | |
|---|---|---|---|
| 2614940 | 10/1977 | Fed. Rep. of Germany | 264/45.9 |
| 2624449 | 12/1977 | Fed. Rep. of Germany | 264/45.9 |
| 2732866 | 1/1978 | Fed. Rep. of Germany | 264/45.9 |
| 2310207 | 1/1977 | France | 425/131.1 |
| 48-5101 | 2/1973 | Japan | 264/45.9 |
| 52-011274 | 1/1977 | Japan | 264/177 R |
| 860391 | 2/1961 | United Kingdom | 264/46.7 |

*Primary Examiner*—Jeffery R. Thurlow
*Attorney, Agent, or Firm*—Guido Modiano; Albert Josif

[57] ABSTRACT

The extrusion head comprises a first extrusion outlet surrounding an aperture wherethrough a metal section can be fed and a second extrusion outlet located externally to the first extrusion outlet, the latter being communicated to a first feed branched channel for the plastics material to be extruded, extending substantially perpendicularly to the feed direction of the metal section, while the second extrusion outlet is in turn communicated to a second plastics material branched channel also perpendicularly extending to the feed direction of the metal section and substantially juxtaposed to the first channel.

3 Claims, 4 Drawing Figures

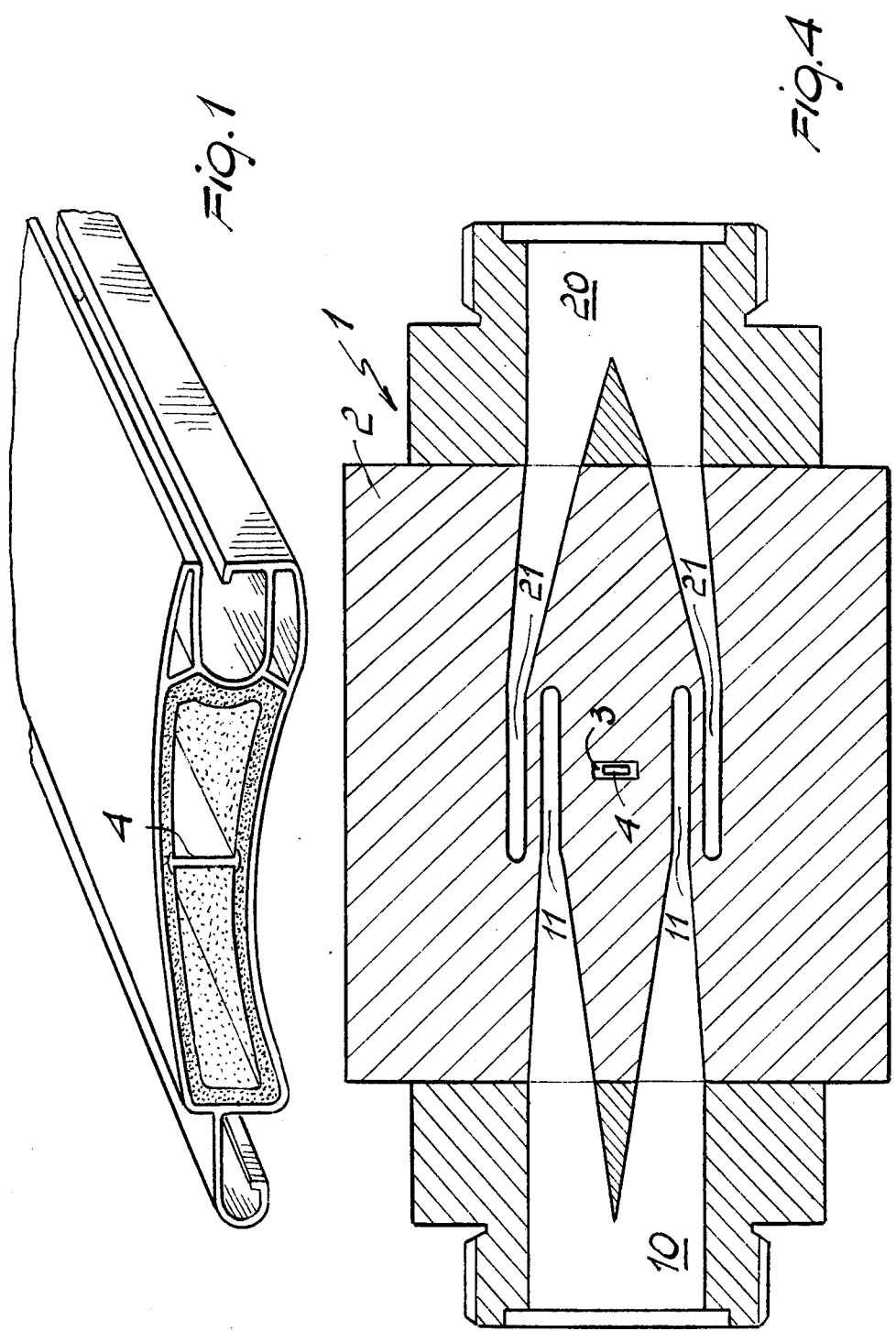

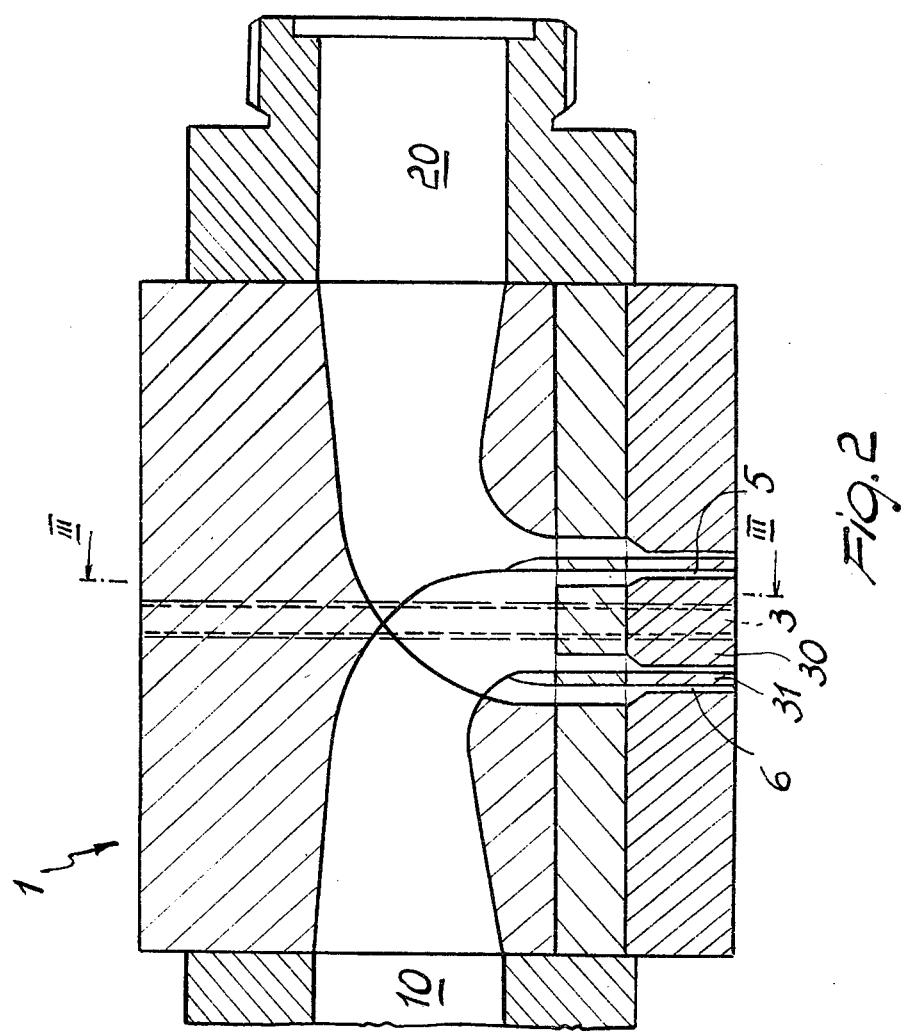
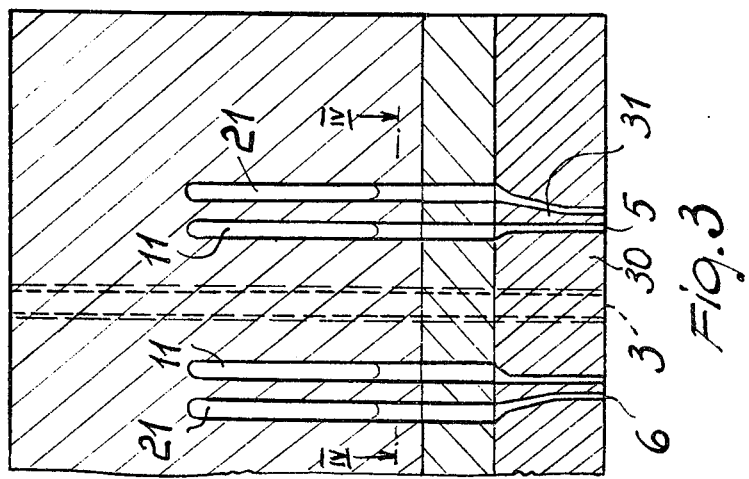

EXTRUSION HEAD FOR EXTRUDING MOULDINGS FOR ROLLER BLINDS, FRAMES, FINISH AND THE LIKE

BACKGROUND OF THE INVENTION

This invention relates to an extrusion head for extruding mouldings for roller blinds, frames or standing finish and the like, and to a moulding obtained thereby.

It is known that in the construction of roller blinds, standing finish and the like, from extruded mouldings of a plastic material, it is sometimes necessary to incorporate metal inserts for the purpose of stiffening such mouldings, especially where large span openings are involved.

The incorporation of said metal inserts is generally effected by manually placing the metal insert into the plastic material moulding after the latter has been extruded.

The insertion of the metal insert is, however, impossible, or at least very difficult to carry out, where mouldings are involved which are made of rigid PVC with an inner core of expanded PVC.

A prior U.S. patent application by the same Applicant Ser. No. 166,226 discloses a moulding which is comprised of an outer skin of rigid PVC and inner liner of foamed or expanded PVC, so arranged as to leave an unoccupied core area in which a metal insert may be inserted, if desired; also in that case, however, the insertion is quite difficult and no reliable bond between the metal insert and plastics moulding can be established.

SUMMARY OF THE INVENTION

This invention sets out to solve the abovementioned problem by providing an extrusion head for extruding mouldings for roller blinds, standing finish and the like, which makes it feasible to incorporate the metal insert directly during the moulding extrusion process, to thus achieve accurate positioning of the metal insert as well as a properly anchored insert within the moulding.

Within the above general aim, it can be arranged that the extrusion head for extruding mouldings for roller blinds, standing finish and the like, according to this invention, affords the achievement of a high quality product at a higher rate and for an almost negligible amount of labour.

The invention is further directed to provide a moulding which, by virtue of its inherent features, can ensure the utmost degree of reliability and safety in use.

According to one aspect of the present invention, there is provided an extrusion head for extruding mouldings for roller blinds, standing finish and the like, characterized in that it comprises at least one aperture through which a metal section can be fed, a first closed contour extrusion outlet surrounding said aperture, and a second closed contour extrusion outlet arranged externally to said first extrusion outlet spaced apart therefrom, said first extrusion outlet being communicated to a first feed channel for a plastics material to be extruded, said first feed channel extending substantially perpendicular to the feed direction of said metal section and having, located at a middle region thereof, a pair of spaced apart channel paths or segments, said second extrusion outlet being communicated to a second feed channel for the plastics material to be extruded, said second feed channel extending substantially perpendicular to the direction of feed advance of said metal section and being juxtaposed to said first channel, said second channel branching out into a pair of spaced apart branches located externally to said channel paths or segments, which are located, at said middle region, inside the area delimited by said branches without interfering with said branches and with said metal section feed.

BRIEF DESCRIPTION OF THE DRAWINGS

Further features and advantages will be apparent from the following description of a preferred, though not limitative, embodiment of an extrusion head for extruding mouldings for roller blinds, standing finish and the like, and of the moulding obtained thereby, as illustrated by way of example only in the accompanying drawings, where:

FIG. 1 shows schematically and in perspective one possible embodiment of a moulding;

FIG. 2 is a sectional view of the extrusion head, taken along a middle plane;

FIG. 3 is a sectional view taken along the line III—III of FIG. 2; and

FIG. 4 shows a section taken along the line IV—IV of FIG. 3.

DESCRIPTION OF THE PREFERRED EMBODIMENTS

With reference to the cited figures, the extrusion head according to the invention, which is generally indicated at 1, comprises a centre body 2 wherein there is formed at least one aperture 3 for feeding a metal section 4 through it. The number of the apertures 3, as well as the specific configuration of the metal section 4 may be any ones in accordance with contingent requirements and the intended application.

On the body 2, there is provided a first extrusion outlet 5 which has, of preference, a closed contour, and which surrounds the aperture 3; around the first outlet 5, a second extrusion outlet 6 is provided, which is spaced apart from the first outlet 5, externally thereto.

The first outlet 5 has the function of extruding, as will be explained hereinafter, rigid expanded PVC, and may be so designed as to create within the mouldling being extruded just an inner core or inner liner to the moulding, or it may be designed to create a solid or filling core within the moulding being extruded; in either case, the metal section 4 will be in practice bonded to and supported by the rigid expanded PVC located on the inside of the moulding being extruded.

The second outlet 6 has the function of extruding the rigid PVC, and has a configuration which corresponds, in practice, to the outer contour of the moulding to be extruded; obviously, its configuration will vary in accordance with the type and shape of the moulding to be extruded.

One of the problems which the invention is directed to solve is that of achieving, in a single extrusion pass, the bond of the rigid PVC and expanded rigid PVC, as well as the bond of the metal section 4 which is extruded simultaneously with the PVC.

For this purpose, the extrusion head 1 has a first feed canalization comprising an inlet length 10 for the extrusion of the expanded rigid PVC, which inlet length extends substantially perpendicular to the feed direction of the metal section 4. At an intermediate length thereof, the first feed canalization 10 branches out into a pair of channel branches 11 which are spaced apart from each other and arranged to lay side-by-side along the core portion spanned by the throughgoing aperture 3. As visible from FIG. 2, each channel branch 11 presents an elbow like arcuate bent to direct the material flow from a direction perpendicular to the aperture 3 to a direction parallel thereto.

The actual implementation of the feed channel does not depart in principle from the standard implementation of a feed channel for an extrusion head, with the peculiar difference of having, located at its middle portion, a pair of channels paths or segments which are spaced apart from each other and such as to create no restriction to the plastics material feed flow.

The head also includes a second feed canalization comprising an input length, indicated at 20, which is intended for feeding rigid PVC and is also arranged to extend substantially perpendicular to the direction of feed advance of the metal section 4, and is advantageously juxtaposed to the first inlet length channel 10.

Said second canalization branches out, at an intermediate length thereof, into a pair of duct branches 21, which are spaced apart from each other and merge with the extrusion area externally to the channel branches 11, thereby defining with the latter ones, two intermediate body portions arranged on the two opposite sides of said core portion, so that the channel branches 11 are practically located inboard of the duct branches 21 and outboard of the aperture 3, thereby no interference can occur between the feed apertures for the metal section and between the first and second feed canalization. As visible from FIG. 2, also each duct channel 21 presents an elbow like arcuate bent to direct the material flow from input length 20 to the second outlet 6, which are arranged perpendicularly to each other.

As shown more clearly in FIG. 4, the channel branches and the duct branches have an elongate cross-sectional configuration, so as not to restrict the passage section.

Downstream of the cited core portion or middle region of the extrusion head, both the channel branches 11 and the duct branches 21 are widened such as to practically unite together and form respectively a first and second closed contour feed channel, whereby the desired moulding profile is achieved.

Where the expanded rigid PVC is to create but an outer liner extrusion, an inner core 30 is provided which is connected to said core portion and defines the aperture 3 for feeding the section 4, said aperture having the function of forming the cavity within the extruded moulding to be obtained, an annular core 31 being further provided between the first and second extrusion outlets connected with said intermediate body portions.

During the extrusion process, owing to the extremely good compatability of the materials being utilized, i.e. of rigid PVC and expanded rigid PVC, the expanded rigid PVC, after being extruded and while expanding, is caused to closely adhere to the rigid PVC, which forms the outer part, and to at least partly incorporate the metal section 4, thus resulting in an assembly which exhibits high strength and thermal insulation properties.

As visible in FIG. 1, a moulding obtained by the present invention comprises an outer skin of rigid PVC having an outer contour corresponding to an outer contour of the moulding and an inner contour, an inner liner of expanded PVC having an outer contour completely surrounded by and adhering to said inner contour of said outer skin and an inner contour having at least two juxtaposed lateral surfaces and defining a cavity therein, at least one metal section arranged in said cavity transversely thereto and having at least two surface portions embedded in said inner liner and connecting said at least two juxtaposed lateral surfaces of said inner liner to define a moulding for roller blinds, frames and standing finish.

It will be appreciated from the foregoing that the invention fully achieves its objects, and in particular that with the extrusion head of this invention it becomes possible to achieve a moulding which has the reinforcing metal section directly embedded therein, without requiring any further processing steps; moreover, the resulting moulding has greatly improved mechanical characteristics, in that the metal reinforcement is securely connected to the extruded moulding.

The invention as conceived is susceptible to many modifications and variations without departing from the scope of the instant inventive concept.

Furthermore, all of the details may be replaced with other technically equivalent elements.

In practicing the invention, the materials utilized, while the best results are to be obtained through the use of the materials mentioned hereinabove, and the dimensions and contingent shapes may be any selected ones to suit individual application requirements.

I claim:

1. An extrusion head for extruding mouldings for roller blinds, standing finish and the like, comprising:

at least one metal section feeding aperture defining an axis of the extrusion head;

a first closed contour extrusion outlet coaxial with, and located externally of, said aperture;

a second closed contour extrusion outlet coaxial with said aperture and said first outlet and arranged externally of said first extrusion outlet spaced apart therefrom;

a first plastics material feed canalization in communication with said first extrusion outlet, said first canalization having an inlet length substantially perpendicular to said feeding aperture and defining a median plane substantially parallel to said axis, an intermediate length comprising two spaced apart channel branches of substantially elongated configuration in cross-section and arranged parallel to each other and to said median plane at two opposite sides thereof and spaced from said aperture, said channel branches opening with one end thereof into said inlet length and with another end thereof into said first extrusion outlet and having an elbow-like arcuate bend in an intermediate zone thereof thereby to direct said other end thereof coaxially to said first extrusion outlet;

a core portion between and separating laterally said two channel branches from each other;

a second plastics material feed canalization in communication with said second extrusion outlet, said second canalization having an input length substantially perpendicular to said feeding aperture and extending in said median plane in a juxtaposed position with respect to said inlet length, an intermediate extension of said second canalization comprising two spaced apart duct branches of substantially elongated configuration in cross-section and arranged parallel to each other and to said median plane externally to, and at two opposite sides of, said channel branches, said duct branches opening with one end thereof into said input length and with another end thereof into said second extrusion outlet and having an elbow-like arcuate bend in an intermediate zone thereof thereby to direct said other end thereof coaxially to said second extrusion outlet, the duct and the channel branches arranged at a same side with respect to said median plane defining between each other a respective intermediate body portion separating laterally said duct and channel branches from each other thereby to avoid interference therebetween.

2. An extrusion head according to claim 1, wherein downstream of said core portion said channel branches widen out to merge together and define a first closed contour feed channel and said duct branches widen out to merge together and define a second closed contour feed channel located externally of said first closed contour feed channel.

3. An extrusion head according to claim 1, wherein inside said first extrusion outlet there is defined an extrusion core connected to said core portion and defining said at least one metal section feeding aperture, and wherein an annular inner core is interposed between said first and second extrusion outlets and connected to said intermediate body portions.

* * * * *